Oct. 19, 1971   H. SCHENK ET AL   3,613,432
FORGING MACHINE

Filed Dec. 2, 1969   4 Sheets-Sheet 1

INVENTORS
HORST SCHENK
BY   JAKOB WETTER
RUDOLF GUSE

McGlew and Toren
ATTORNEYS

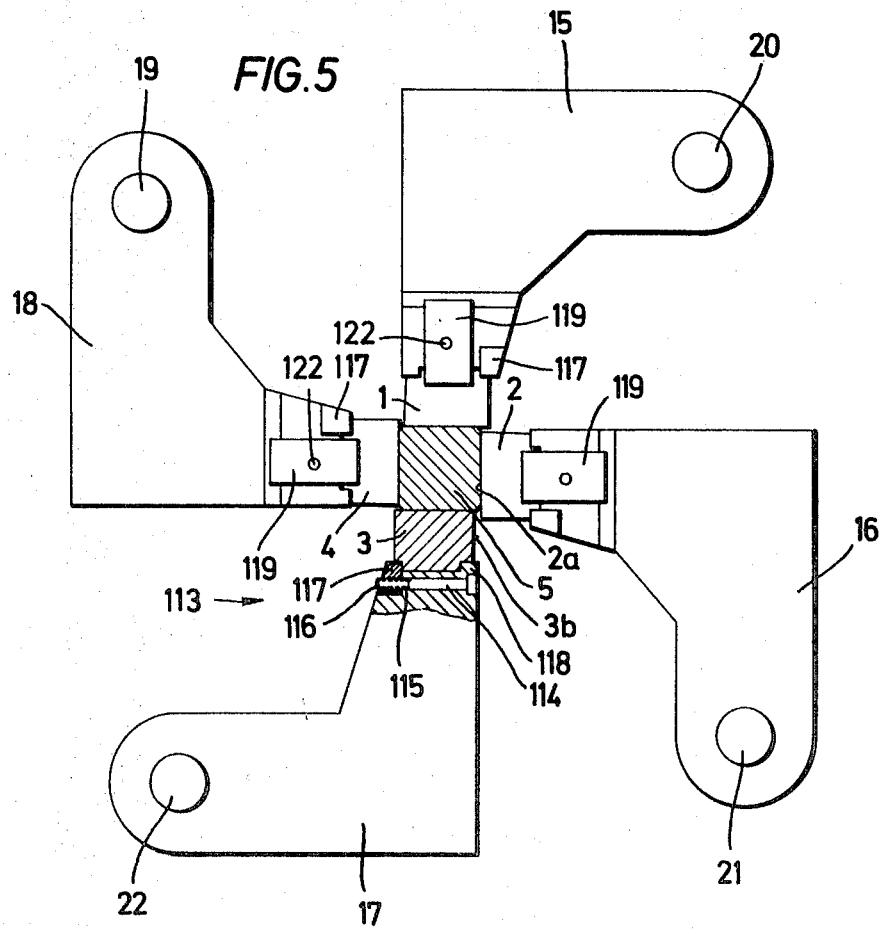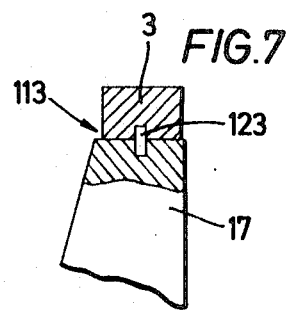

United States Patent Office 3,613,432
Patented Oct. 19, 1971

3,613,432
FORGING MACHINE
Horst Schenk, Dusseldorf-Rath, Jakob Wetter, Huls, and Rudolf Guse, Dusseldorf-Rath, Germany, assignors to Maschinenfabrik Sack G.m.b.H., Dusseldorf-Rath, Germany
Filed Dec. 2, 1969, Ser. No. 881,467
Claims priority, application Germany, Dec. 2, 1968, P 18 12 169.2
Int. Cl. B21j 9/12
U.S. Cl. 72—399
17 Claims

ABSTRACT OF THE DISCLOSURE

A forging machine is disclosed having four forging saddles carried on guiding arms which are pivoted on a frame. Each saddle has a hydraulic ram by which it can be moved inwards in use, the four saddles embracing a workpiece and reducing its cross-section. The pivots of the guiding arms are shiftable relatively to the frame whereby the machine in capable of forging rectangular section bar, the ratio between the sides of the rectangle taking any value within a range. For ease of adjustment the four pivots are arranged as two adjacent pairs each pair of pivots being coupled together by being mounted on a common slider. Each of the rams is preferably rigidly fixed to the frame and connected to its saddle through a doubly articulated joint. Each saddle is preferably connected to its guiding arm by an overload safety connector which responds, for example by braking should one saddle foul its neighbour and impose excessive forces upon the neighbouring pivot.

---

This invention relates to forging machines and is an improvement in that forming the subject matter of our patent application Ser. No. 668,019 filed Sept. 15, 1967, now Pat. No. 3,478,565. The earlier application is directed to a forging machine having at least three forging saddles which are arranged to surround a workpiece in use and, by moving towards each other, reduce the cross sectional area of the workpiece, each saddle having a pressure face to bear against the workpiece, and end face and a guide member which constrains the saddle to maintain its end face closely adjacent to the pressure face of a neighbouring saddle as the saddles move inwards towards each other in use, each guide member being rigid with the respective saddle, from which it extends at an angle to the direction of movement of the saddle, and being pivoted on a fixed part of the machine about a pivot which is adjustable in position relatively to the fixed part of the machine in a direction perpendicular to its axis whereby the machine can accommodate in use workpieces of different cross-sections.

A forging machine which has the above characteristics is particularly suitable for producing bar of polygonal cross section, the number of sides depending on the number of forging saddles. Four forging saddles allow bar material to be produced of square or rectangular cross section. The fact that the axes of the guiding arms for the saddles are adjustable in position makes it possible to produce bar of, for example, rectangular cross section with different ratios between the sides, using the same forging machine.

For this purpose it is necessary to adjust the positions of two diametrically opposite guiding arm axes in the same direction, relative to the axis of the workpiece, the two other guiding arm axes remaining where they are. A still higher ratio between the sides of the rectangle can be obtained by adjusting the positions of the second pair of guiding arm axes, again shifting them both in the same direction, but this time in the opposite direction compared with the first adjustment.

Although this known forging machine has satisfied the requirements very well in practice, nevertheless it has been found that both the functioning of the machine and its method of operation by an operator can be improved by introducing certain constructional improvements, which are the subject of the present patent application. In order to obtain a product of truly rectangular cross section with the necessary precision, the opposite guiding arm axes must be shifted in position by precisely the same amount. Individual adjustment of the axes is a time consuming operation.

In accordance with the present invention, the pivots of at least one pair of neighbouring guide members of a forging machine constructed in accordance with claim 1 of specification No. 1,144,845, are coupled together in such a way that their positions are interdependent and can be adjusted together.

This enables the positions of the pivot axles to be adjusted both more simply and more precisely. In order to change the machine over for producing bar of different side ratio, for example rectangular cross section bar, it can be necessary merely to shift a pair of coupled guiding member pivots together. This adjustment is rapid and easy to effect and a particularly compact forging machine can be obtained.

A very simple adjustment in position of two neighbouring guiding member pivots can be obtained by mounting the two pivots on a common slider which slides in a fixed part of the machine such as a frame. Each slider can be adjustable in position by means of a screw threaded spindle, which thrusts against one end of the slider, and a hydraulic ram, which thrusts against the other end of the slider. The position of the slider can be conveniently adjusted by rotating the screw threaded spindle at one end, the hydraulic ram at the other end serving to keep the slider in firm contact with the spindle. In a four saddle machine, a particularly compact construction can be obtained by mounting two sliders so that they slide parallel to each other each slider carrying the pivots of a pair of neighbouring guide members, a further advantage being obtainable by mounting the adjustment spindles so that they are both accessible from the same side of the machine, for ease of operation.

Hydraulic rams are ordinarily provided for moving the saddles towards one another. The rams have been connected at one end to the fixed part of the machine and at the other end to the saddles in each case through an articulated joint to allow for the arcuate movement of the saddles. It is now found preferable to provide a doubly articulated joint between each forging saddle and its hydraulic ram, and to fix the ram rigidly to the machine frame. The only flexible or articulated connection is then between the forging saddle and its ram. This arrangement allows the forging machine to be constructed in a considerably simpler manner.

A suitable doubly articulated joint comprises two part-spherical heads connected together by a tie rod and between the two spherical heads a doubly cupped disc having part-spherical depressions in both faces in which the heads are seated. Preferably there is a clearance between the surfaces of the spherical heads and those of the doubly cupped disc, this working clearance allowing the doubly articulated joint to operate for long periods almost without suffering wear, in spite of the comparatively rapid operating cycle of the forging machine.

In order to keep the clearances open, between the doubly cupped disc and the two spherical heads, lubricant under high pressure may be injected between the working surfaces, that is to say into the clearance of gap between the doubly cupped disc and the two spherical heads. The lubricant is preferably injected during periods of nonworking, that is to say during the parts of the working cycle when the drive is stroking forwards or backwards without applying the forging thrust. The lubricant is injected in metered amounts, the quantity injected each time being sufficient to ensure that enough lubricant remains between the working surfaces of the doubly cupped disc and the spherical heads, all through the working stroke to prevent metal to metal contact. A doubly articulated joint constructed in this way shows only negligible wear after long periods of operation.

The clearance gap between the working surfaces of the doubly cupped disc and the spherical heads is preferably sealed around the outside by sealing rings. Annular oil feed ducts may be provided around the middle parts of the working surfaces. The lubricant can escape through a central drilling in the doubly cupped disc, finally leaving the system through outlet ducts provided for the purpose. The tie rod passes through the central drilling in the doubly cupped disc. The lubricant, injected under pressure through the inlet ducts thrusts the working parts apart, opening the clearance gap. Excess lubricant escapes entirely inwards through the central drilling in the doubly cupped disc, finally leaving the system through the outlet ducts, leakage being prevented by the sealing rings.

The tie rod, which connects together the two spherical heads, is itself preferably anchored at its two ends by screwing into spherical surfaced nuts which work in spherical cups in the bases of the part-spherical heads mentioned above. Each spherical head can if desired have a neck which has an external thread and which screws into the ram piston, or the forging saddle or its guiding member. A double articulated joint constructed in this way forms a complete unit, that is to say an independent assembly in its own right, which can easily be inserted between the ram piston and the forging saddle, or its guiding member, the joint being finally screwed home into these two parts of the machine.

It can sometimes happen, due to uneven loading of the forging saddles, or a failure of synchronisation in the driving devices which thrust against the forging saddles that the pressure face of one saddle can bear against the end face of a neighbouring saddle and produce high stresses. To prevent these high stresses from being transmitted to the pivot axles of the guiding members each forging saddle may be connected to its guiding member through an overload safety connection arranged to respond as soon as the force acting between the pressure face of the forging saddle and the side face of the neighbouring saddle exceeds a specified value. The effect obtained is that as soon as the thrust exerted by the pressure surface of one forging saddle on the side surface of its neighbouring saddle becomes excessive the overload safety connection responds preferably by breaking the connection between the overloaded saddle and its guiding member, allowing the overloaded saddle to escape by moving in the direction of the working load applied by the other saddle.

The overload safety connection can for example consist of one or more tension bolts grooved to rupture at a particular cross section. The tension bolts are preferably screwed into retainer strips attached to the guiding arms, each forging saddle being clamped on to its guiding arm between a retainer strip and a projection of the guiding arm.

On the other hand instead of one or more tension bolts there can if desired be used as the overload safety connection for each forging saddle one or more shear bolts forming a shearable connection between the forging saddle and its guiding arm. The cross sections of the shear bolts are calculated so that the bolts shear on the application of an excessive shearing force.

Three examples of forging machines, and a modification of the third machine, are illustrated in the accompanying drawings, in which:

FIG. 5 is a view similar to FIGS. 1 and 3 of the third example;

FIG. 6 is a section showing a connection between a forging saddle and its guiding arm of the third example;

FIG. 7 is a section similar to FIG. 6 but showing a modified connection.

The drawings show only those parts which are necessary in explaining the invention. Other parts, for example the drive for advancing the workpiece through the machine, and the arrangements for feeding the machine with raw material, have been omitted from the drawings for the sake of simplicity in representation.

The present example is a forging machine for producing bar stock of rectangular cross section. Nevertheless by using a different number of forging saddles it is possible in principle to manufacture bars of other polygonal cross sections.

Figure 2:
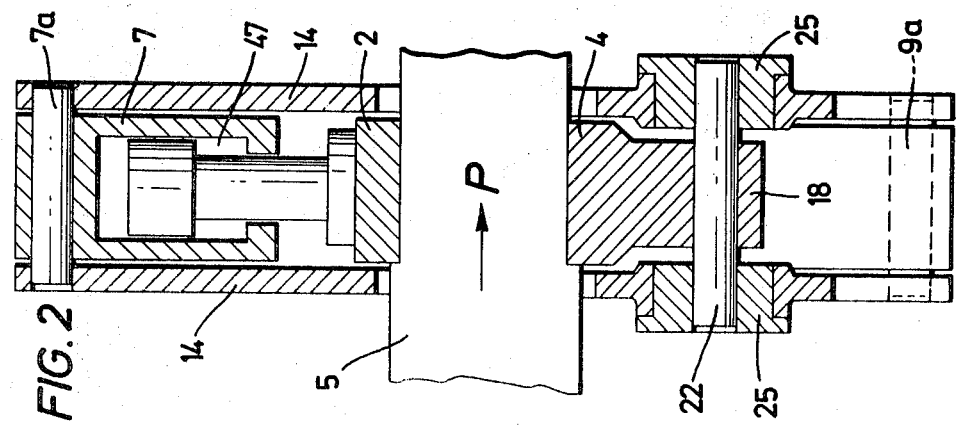
FIG. 2 is a section taken on the line II—II in FIG. 1.
Figure 1:
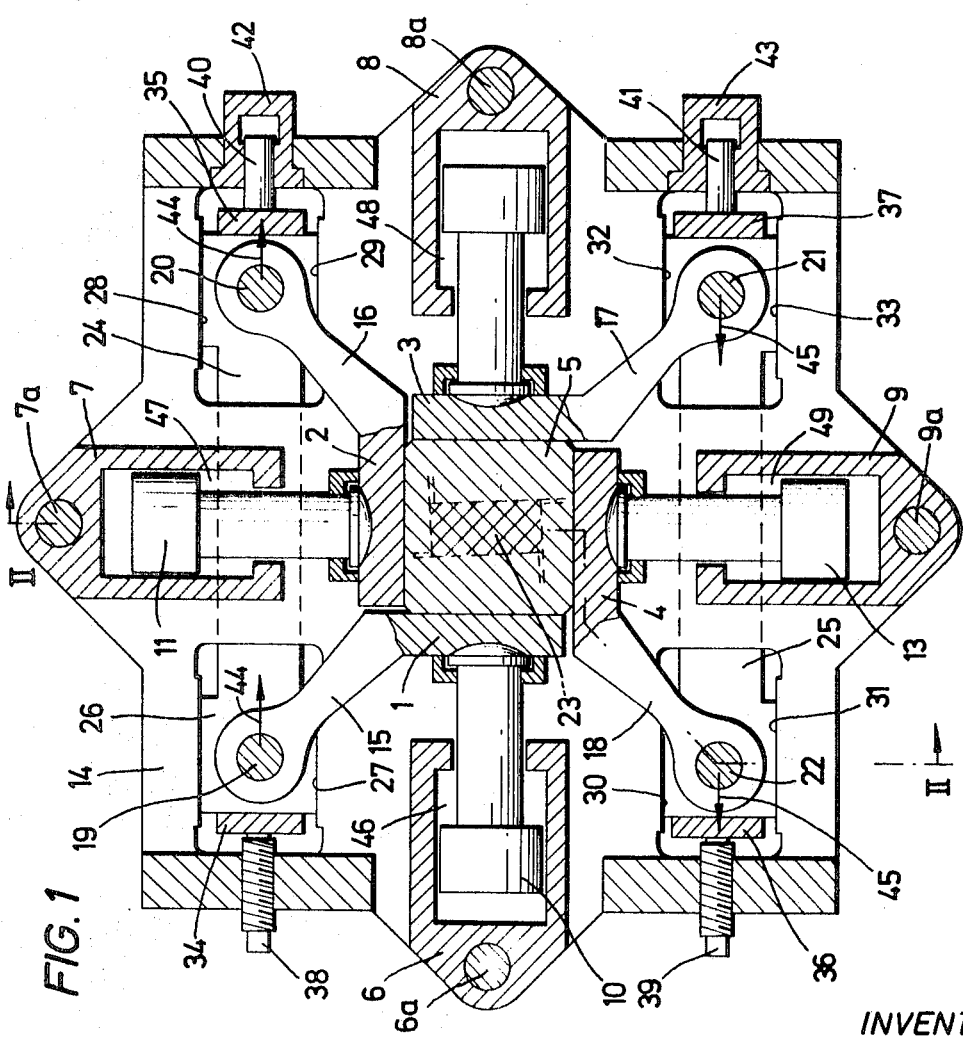
FIG. 1 is an elevation, with parts in section, of the first example.

The forging machine of FIGS. 1 and 2 has four forging saddles, 1, 2, 3, 4 positioned at 90° with respect to each other. The forging saddles between them enclose a workpiece 5.

Each forging saddle is acted on by a hydraulic ram and the ram cylinders 6, 7, 8, 9 are pivoted on the machine frame 14 by pivot pins 6a, 7a, 8a and 9a. Hydraulic fluid thrusts the ram pistons 10, 11, 12, 13 forwards so that they drive the saddles 1, 2, 3, 4 towards the middle of the machine, and reduce the cross section of the workpiece 5. The saddles are guided by guiding arms 15, 16, 17 and 18, mounted on pivot axles 19, 20, 21 and 22 which extend perpendicularly to the paper in FIG. 1 and parallel to the direction of advance of the workpiece, indicated by the arrow P in FIG. 2. Each of the guiding arms 15, 16, 17 and 18 forms an angle with the direction of the thrust applied by its saddle to the workpiece 5. In the present example each guiding arm 15, 16, 17, 18 forms a 45° angle with the axes of the two neighbouring ram cylinders.

Hydraulic fluid supplied under pressure to the ram cylinders 6, 7, 8 and 9, allows the workpiece 5 to be squashed by the forging saddles 1, 2, 3 and 4, to give the desired reduced cross section. From the longitudinal section shown in FIG. 2 it will be seen that the workpiece is reduced stepwise. After each working stroke of all the rams the pistons return far enough to allow the workpiece to be advanced in the direction of the arrow P one saddle width, ready for the next working stroke. In nearly all cases the operation is hot forging.

When it is desired to forge the workpiece to a rectangular cross section with a specified side ratio, for example as represented by the cross hatched rectangle 23, the machine is changed over by shifting the guiding arm axles 19, 20, 21 and 22 in pairs in directions at right angles to the workpiece axis. For this purpose the axle pins 19 and 20 of the neighbouring guiding arms 15 and 16 of the forging saddles 1 and 2 are mounted on a slider 24, and the axles 21 and 22 of the other two guiding arms 17 and 18 of the forging saddles 3 and 4 are mounted on a second slider 25. The sliders 24 and 25 slide along guiding surfaces 26, 27, 28 and 29, and 30, 31, 32 and 33 respectively in the machine frame 14. Each of the sliders 24 and 25 is held in position at one end by an adjustment spindle 38 and 39 respectively which thrusts against a pressure plate 34 or 36 interposed between the spindle and the end of the slider, and at the other end by a hydraulic ram piston 40 or 41 working in a cylinder 42 or 43, the ram piston thrusting against a pressure plate 35, 37, interposed between the ram piston and the end of the slider. The hydraulic cylinders 42, 43 thrust the sliders 24 and 25 against the adjustment spindles 38 and 39, and retain the sliders firmly in place.

The mounting of the axles 19, 20, 21 and 22 on the sliders 24 and 25 so that the axle pins are adjustable in position allows changes to be made, in the manner described above, to the cross sectional shape of the forged product. For example when it is desired to produce rectangular cross section bar with a specified side ratio, as represented at 23, this can easily be arranged by shifting the slider 24, with its two axle pins 19 and 20 in the direction indicated by the arrows 44, towards the right in FIG. 1, and shifting the other slider 25, with its axle pins 21 and 22, towards the left as indicated by the arrows 45. To shift the upper slider 24 in position the pressure in the hydraulic ram cylinder 42 is first reduced, whereupon the slider 24 is shifted towards the right by means of the adjustment spindle 38. The slider is locked in the desired position by applying hydraulic pressure in the ram cylinder 42. To adjust the other slider 25 in position, in the opposite direction, the adjustment spindle 39 is screwed out of the machine frame, whereupon hydraulic fluid is admitted to the ram cylinder 43, thrusting the slider 25 towards the left until its pressure plate 36 comes to rest against the end of the adjustment spindle 39. To put the machine in operation, after introducing the workpiece 5, hydraulic fluid is fed to the ram cylinders 6, 7, 8, 9, squashing the workpiece from four sides to give it the cross section represented by the cross hatched rectangle 23. For the return stroke hydraulic fluid is admitted to the return stroke cylinder chambers 46, 47, 48, 49, thrusting the ram pistons in the cylinders 6, 7, 8, 9, back to their initial positions, whereupon the workpiece 5 is advanced a step.

From what has been said above it emerges that by suitably displacing the axles 19, 20, 21 and 22 in pairs a variety of rectangular cross sections with different side ratios can be produced, the side ratio being determined by the distances through which the two sliders 24, 25 are shifted. Alternatively a different rectangular cross section can be obtained by shifting only one of the sliders.

Figure 3:
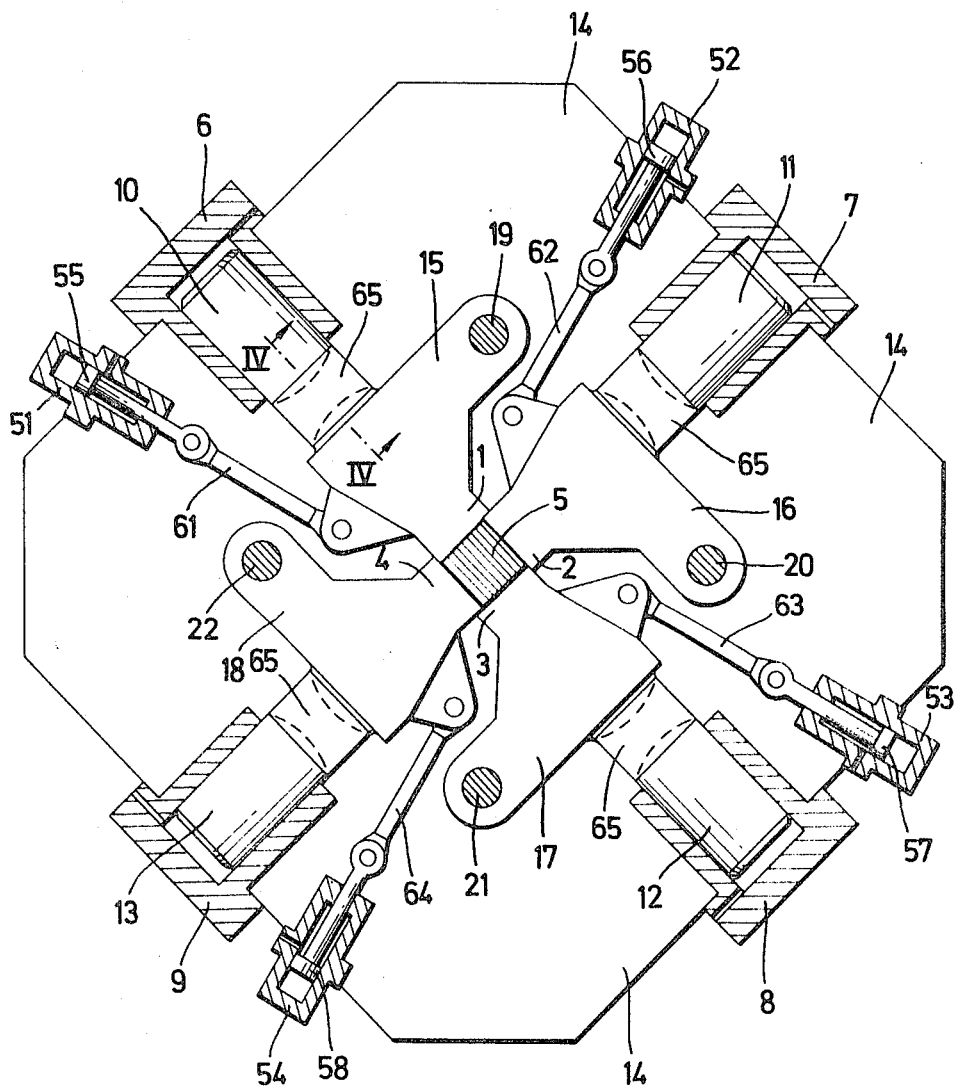
FIG. 3 is a view similar to FIG. 1 of the second example.

In the example represented in FIG. 3 the parts which correspond to parts shown in FIG. 1 have been given the same reference numerals. In FIG. 3 the hydraulic working ram cylinders 6, 7, 8 and 9 are fixed rigidly to the machine frame 14. A further difference, compared to the machine shown in FIG. 1, is that each forging saddle, 1, 2, 3, 4, forms with its guiding arms 15, 16, 17, 18 an angular structure such that the longitudinal axis of each guiding arm extends approximately parallel to the pressure surface of its forging saddle.

The drawing assumes that a product of square section is being forged. When it is desired to produce a product of rectangular cross section with a specified side ratio, the operator shifts the axle pins 19, 20, 21, 22 of the guiding arms 15, 16, 17, 18 transversely relative to the axis of the workpiece, this adjustment being effected in the manner already described above. After each working stroke the forging saddles 1, 2, 3, 4 are returned to their initial position by separate return stroke hydraulic rams whose cylinders are indicated at 51, 52, 53 and 54. Each of the return stroke hydraulic cylinders 51, 52, 53 and 54 contains a piston 55, 56, 57 and 58 respectively connected to the corresponding forging saddle 1, 2, 3 or 4 by a connecting rod 61, 62, 63 or 64. After the forging saddles have been retracted, the workpiece 5 is advanced one saddle width, ready for the next forging stroke.

The working ram cylinders 6, 7, 8, and 9 are fixed rigidly to the machine frame 14, and the working ram pistons 10, 11, 12 and 13 therefore advance in straight lines towards the centre of the forging machine. On the other hand, the guiding arms 15, 16, 17 and 18 of the forging saddles 1, 2, 3 and 4, follow circular paths about the pivot axes of the guiding arms. To compensate for this difference in movements it is necessary to provide, between the pistons 10, 11, 12 and 13 and the guiding arms 15, 16, 17 and 18 an articulated joint which, in this example takes the form of a doubly articulated joint 65.

Figure 4:
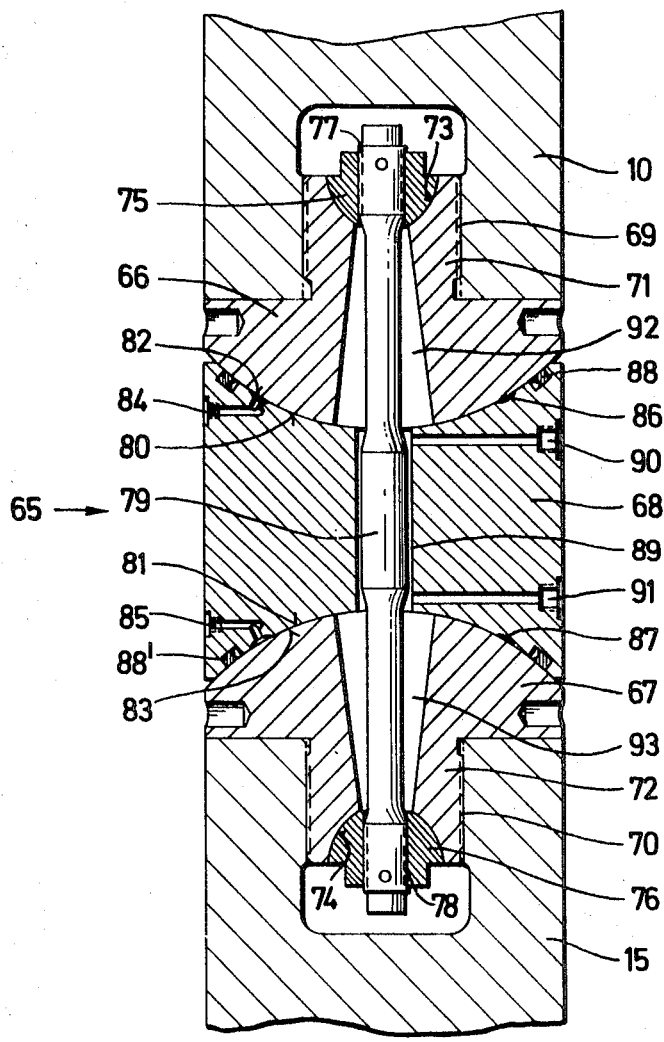
FIG. 4 is a section drawn to a larger scale through a doubly articulated joint, the section taken on the line IV—IV in FIG. 3.

In FIG. 4 the doubly articulated joint 65 is represented between the working ram piston 10 and its guiding arm 15. The doubly articulated joint 65 consists essentially of two part-spherical heads 66 and 67 engaging with a doubly cupped intermediate disc 68 having a depression in each face, a certain clearance remaining however between the working surfaces of these parts. The part-spherical heads have necks 71, 72 formed with external threads 69, 70 by which the part-spherical heads are screwed into the working ram piston 10 and the guiding arm 15. The end face of each neck 71 and 72 contains a cup shaped recess 73, 74 which accommodates a spherical surfaced nut 75, 76. The spherical surfaced nut 75, 76 can rotate or rock in the cup shaped recess 73, 74. A tie rod 79 has externally threaded ends 77, 78 which are screwed into the spherical surfaced nuts 75, 76. The tie rod 79, acting through the spherical surfaced nuts 75, 76, ties the spherical heads 66, 67 together with the doubly cupped disc between, leaving however a clearance between the working surface 80, 81 of each head and the working surface 82, 83, of the corresponding depression in the disc 68 sufficient to allow the doubly articulated joint 65 to work. The clearance gap is held open by a lubricant fed under high pressure, the lubricant thrusting the spherical heads 66, 67 away from each other and away from the doubly cupped disc 68. The lubricant is fed to the joint during the nonworking, return stroke of the working ram piston, and during the load free first part of the forward stroke. The lubricant is fed in precisely metered quantities so that during the working part of the forward stroke, when the parts are under load, enough lubricant remains between the working surfaces 80, 81, 82, 83 to prevent metal to metal contact and thus prevent excessive wear on the doubly articulated joint 65.

The lubricant under pressure is fed through inlet ducts 84, 85 leading to annular ducts 86, 87 in the working surface 82, 83 of the doubly cupped disc 68. The outer edges of the working surfaces 80, 81, 82, 83 have ring seals 88, 88' to prevent escape of lubricant. Excess lubricant can escape only through a central drilling 89 in the doubly cupped disc 68 and out through lubricant outlet ducts 90, 91. The tie rod 79 passes through the drilling 89 in the double cupped disc 68.

To allow the doubly articulated joint 65 to perform angular movements, which are necessary for a correct forging process, each spherical head 67 has a conical drilling 92, 93 extending from the cup shaped recess 73, 74 to the working surface 80, 81, the drilling opening conically towards the working surface.

The doubly articulated joint 65 forms a complete unit and can be manufactured separately before being installed between the forging saddles of the machine and its working ram pistons. Each doubly articulated joint 65 is screwed into these two parts by means of the external threads 69, 70 on the stems or shafts of the spherical heads 66, 67.

In the example shown in FIG. 5, the driving arrangements for the forging saddles are omitted for greater clarity. The parts which have already been discussed retain the same index numbers. Under certain operating conditions each forging saddle can thrust, with its pressure surface, not only against the surface of the workpiece but also against a side surface of a neighbouring saddle. For example contact can occur between the pressure surface 2a of the saddle 2 and the side surface 3b of the saddle 3.

The forging saddles 1, 2, 3, 4 are driven by a drive system which is not shown in FIG. 5, towards the centre of the machine, to squash the workpiece. This movement of the forging saddles is guided by guiding arms 15, 16, 17, 18, which form angles with the saddles. Each guiding arm pivots about an axle pin 19, 20, 21, 22, the geometric axis of each axle pin extending parallel to the axis of the workpiece. The axle pins 19, 20, 21, 22 are mounted so that they can be shifted for adjustment in directions perpendicular to the workpiece axis, for the purpose of producing rectangular section bar of specified side width ratios.

In the event of uneven loading of the forging saddles 1, 2, 3, 4, that is to say if one saddle becomes loaded more than another, due to uneven functioning of the drive system, or due to failure of one or more of the drive systems, or due to failure in the synchronisation control for the drive systems, it can happen that one or more of the forging saddles come into contact with neighbouring saddles, that is to say the pressure surface of one saddle comes to rest against a side surface of a neighbouring saddle, with the result that very high thrusts can be transmitted to the axle pins of the guiding arms. To prevent this, each forging saddle is connected to its guiding arm through an overload safety connection 113. The overload safety connection 113 is constructed in such a way that as soon as the load applied by the pressure surface of a forging saddle to a side surface of a neighbouring saddle exceeds a certain value the connection between the overloaded forging saddle and its guiding arm is opened.

In the example shown in FIG. 5 the overload safety connection is in the form of a tension bolt 114 inserted through each guiding arm, the tension bolt 114 having a groove 115 at the intended location of rupture. The threaded end 116 of the tension bolt 114 is screwed into a retainer strip 117 which is thrust firmly by the tension bolt 114 against the forging saddle. The opposite side of the forging saddle is supported by a projection 118 of the guiding arm. The material and diameter of the tension bolt 114, at its rupture zone 115 is calculated so that the bolt 114 ruptures when the specified excess load is reached, with the result that the connection between the forging saddle and its guiding arm is opened.

The overload safety connection shown in FIG. 5, which can contain one or more tension bolts 114, is equipped with auxiliary supports for the forging saddle as shown in FIG. 6, consisting of two plates 119 and 121, positioned laterally and rotated through 90°, with respect to the tension bolts 114, and tied together by a screw threaded pin 122. The plates 119, 121 act as retainers and guides, holding the forging saddle to its guiding arm but allowing the saddle, after the overload safety connection has opened, to slide away in the direction of the applied excess load.

In the example shown in FIG. 7, the overload safety connection 117 is in the form of a shear pin 123 connecting the forging saddle to its guiding arm. The diameter of the shear pin 123 is calculated so that it shears off as soon as the applied shearing force exceeds a specified value, the excess shearing force being applied by contact between the pressure surface of the one forging saddle and a side surface of the neighboring saddle.

It should be of course understood that other types of overload safety connection can be used. For example, in principle there could be used limit switches, strain gauges or the like which switch off the drive to a forging saddle as soon as the thrust applied by the pressure surface of the saddle to the side surface of the neighboring saddle exceeds a safe value.

We claim:

1. A forging machine comprising a fixed frame, at least three forging saddles, each of said forging saddles having an end face and a pressure face, said pressure faces defining a throat adapted to receive a workpiece, means for moving each of said saddles relatively to said frame inwards to constrict said throat, guide means adapted to maintain said end face of each of said saddles closely adjacent said pressure face of a neighboring one of said saddles during said inward movement, pivot means connecting said guide means to said frame, adjustment means for shifting said pivot means relatively to said frame and coupling means interconnecting at least one adjacent pair of said pivot means whereby both of said adjacent pair of pivot means can be shifted together in a single adjustment operation.

2. A forging machine according to claim 1, wherein four of said saddles are provided and said machine includes a first slider adapted to slide relatively to said frame and carrying said pivot means of an adjacent pair of said four saddles, and a second slider adapted to slide relatively to said frame and carrying said pivot means of the remaining pair of said four saddles.

3. A forging machine according to claim 2, wherein said adjustment means comprises a first jack screw adapted to thrust against one end of said first slider and a first hydraulic ram adapted to thrust against the other end of said first slider, and a second jack screw adapted to thrust against one end of said second slider and a second hydraulic ram adapted to thrust against the other end of said second slider.

4. A forging machine according to claim 3, wherein said first and second sliders are adapted to slide parallel to each other.

5. A forging machine according to claim 1 wherein said means for moving each of said saddles relatively to said frame comprises a hydraulic ram, means rigidly fixing said ram to said frame and doubly articulated joint means connecting said ram to said saddle.

6. A forging machine according to claim 5, wherein each doubly articulated joint means comprises two part-spherical heads, a tie rod interconnecting said heads and a doubly cupped disc interposed between said heads.

7. A forging machine according to claim 6, wherein said heads and said disc are spaced apart to provide a lubrication clearance and said machine includes means for feeding lubricant into said clearance at high pressure.

8. A forging machine according to claim 7, further comprising ring seals interposed between said part-spherical heads and said disc and annular lubrication grooves communicating with said lubrication clearance within said ring seals and a central opening in said disc whereby excess lubricant can escape.

9. A forging machine according to claim 6, wherein each of said doubly articulated joints further comprises a pair of spherical surfaced nuts at each end of said tie rod and each of said part-spherical heads being formed with a recess adapted to accommodate one of said spherical surface nuts.

10. A forging machine according to claim 9, wherein each of said recesses communicates with a central opening in said disc through a conical opening in the respective one of said heads diverging towards said central opening in said disc.

11. A forging machine according to claim 10 wherein each spherical head includes an externally screw-threaded neck adapted to be screwed into the corresponding one of said saddle and said means for moving said saddle.

12. A forging machine according to claim 11, wherein said necks enclose said recesses accommodating said spherical surface nuts.

13. A forging machine according to claim 1 including overload responsive connection means connecting each of said forging saddles to the corresponding guiding means and adapted to respond in the event that the force applied by said pressure face of one of said forging saddles to said end face of a neighbouring one of said forging saddles exceeds a certain predetermined value.

14. A forging machine according to claim 13 wherein said overload responsive connection means comprises at least one tension bolt adapted to rupture at a predetermined rupture zone in the event that said force exceeds said predetermined value.

15. A forging machine according to claim 14, further comprising a retainer strip adapted to receive said tension bolt and a projection on each guiding means, said saddle being adapted to be clamped between said retainer strip and said projection.

16. A forging machine according to claim 13, wherein said overload responsive connection means comprises at least one shear bolt adapted to connect each forging saddle to its guiding member.

17. A forging machine according to claim 13 wherein each guide means is provided with lateral plates disposed perpendicularly both to said pressure face and to said end face of said saddle and adapted to embrace said saddle.

References Cited

UNITED STATES PATENTS

| | | | |
|---|---|---|---|
| 1,144,845 | 6/1915 | Hootman | 180—43 |
| 1,313,380 | 8/1919 | Henggi | 72—399 |
| 2,211,622 | 8/1940 | Hunziker | 72—402 |
| 3,263,478 | 8/1966 | Brauer | 72—402 |
| 3,451,249 | 6/1969 | Sharon | 72—402 |
| 3,478,565 | 11/1969 | Schenk | 72—399 |

FOREIGN PATENTS

| | | | |
|---|---|---|---|
| 449,558 | 9/1927 | Germany | 72—399 |
| 1,084,111 | 7/1963 | Germany | 72—399 |

CHARLES W. LANHAM, Primary Examiner

G. P. CROSBY, Assistant Examiner

U.S. Cl. X.R.

72—402, 453